(12) United States Patent
Iizuka et al.

(10) Patent No.: US 6,466,351 B1
(45) Date of Patent: Oct. 15, 2002

(54) MULTI-BEAM OPTICAL SYSTEM

(75) Inventors: Takashi Iizuka; Masato Noguchi, both of Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 25 days.

(21) Appl. No.: 09/643,719

(22) Filed: Aug. 23, 2000

(30) Foreign Application Priority Data

Aug. 26, 1999 (JP) .......................................... 11-239293

(51) Int. Cl.⁷ .............................................. G02B 26/08
(52) U.S. Cl. ........................................ 359/209; 359/17
(58) Field of Search .................................. 352/566, 569, 352/204, 208; 355/402, 403, 53, 67; 347/241; 359/209, 17, 19

(56) References Cited

U.S. PATENT DOCUMENTS 5,657,121 A * 8/1997 Nishina ....................... 356/327
6,021,000 A 2/2000 Iizuka et al. ................. 359/574

* cited by examiner

Primary Examiner—Cassandra Spyrou
Assistant Examiner—Alessandro V. Amari
(74) Attorney, Agent, or Firm—Greenblum & Bernstein, P.L.C.

(57) ABSTRACT

Disclosed is a multi-beam optical system that includes a laser source, a diffractive beam dividing element that divides the light beam emitted from the laser source into a plurality of light beams, a propagation optical system through which the divided light beams propagate, a polygon mirror and a scan lens. The propagation optical system includes a curved surface mirror that is arranged such that center axes of the reflected light beams are spatially separated from center axes of the incident light beams at a predetermined separation angle. The diffractive beam-dividing element Is arranged such that the center axis of the incident light beam is inclined with respect to the normal to a diffraction grating surface thereof so as to compensate bending of a beam spot line, along which the beam spots align, depending on the separation angle of the curved surface mirror.

5 Claims, 5 Drawing Sheets

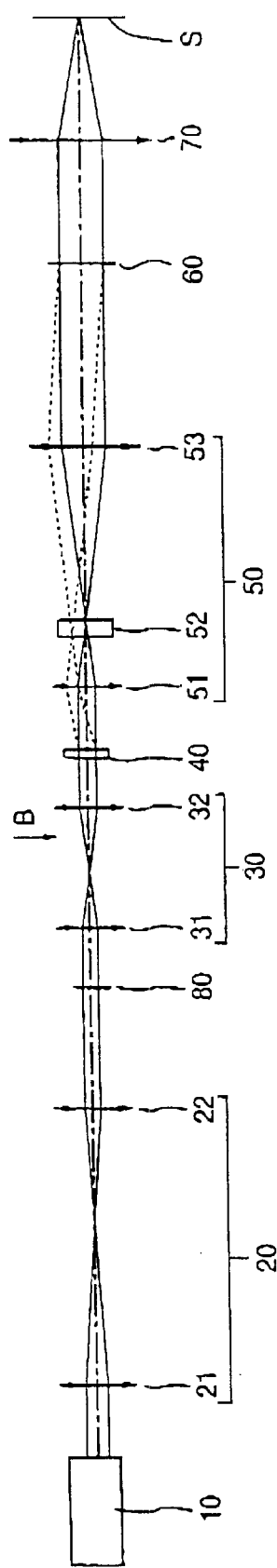
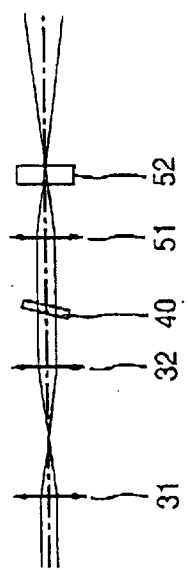
FIG.2A
FIG.2B

MULTI-BEAM OPTICAL SYSTEM

BACKGROUND OF THE INVENTION

The present invention relates to a multi-beam optical system that divides a light beam emitted from a light source into a plurality of light beams to form a plurality of beam spots on an object surface to be exposed This kind of multi-beam optical system is used in a scanning photo plotter that forms circuit patterns of semiconductor devices on the object surface, for example. Since a multi-beam scanning photo plotter simultaneously forms a plurality of scanning beam spots on the object surface, a plurality of scan lines can be obtained per one scan, which enables to plot circuit patterns with high speed. In the specification, the scanning direction of the beam spots is defined as "a main scanning direction", a direction perpendicular to the main scanning direction on the object surface is defined as "an auxiliary scanning direction", and a line along which the beam spots align is referred to as "a beam spot line".

The multi-beam scanning photo plotter is required to locate a plurality of beam spots along a straight line on the object surface. That is, the beam spot line should be straight. Further, the beam spot line is angled with respect to both of the main scanning direction and the auxiliary scanning direction to make a space between adjacent scan lines be smaller than a distance between adjacent beam spots.

FIG. 9 shows arrangements of beam spots on the object surface in a five-beam scanning photo plotter. The five beam spots should be located at the positions as shown by ellipses illustrated by solid lines that are aligned along a straight beam spot line illustrated by a solid line.

In the field of semiconductor devices, a circuit pattern becomes finer to increase density of a circuit and to downsize a device. A finer circuit pattern requires a high resolution for the scanning photo plotter. Since the resolution increases as the wavelength of the light beam becomes short, it is preferable to use a short wavelength laser beam such as an ultraviolet beam. However, since optical glass generally absorbs an ultraviolet beam, lenses lower the light amount of the laser beam that reaches to the object surface. Therefore, it is preferable that the optical system includes a curved surface mirror instead of a lens when an ultraviolet beam is used.

When the curved surface mirror is used in the optical system, an optical path to be incident on the curved surface mirror and an optical path reflected therefrom should be separated to spatially separate a reflection beam from an incident beam.

However, since the separation of the optical paths bends the beam spot line in the multi-beam scanning optical system, the spaces between scan lines become uneven. For instance, as shown in FIG. 9, the five beam spots are located at the positions as shown by ellipses illustrated by dotted lines that are aligned along the curved beam spot line illustrated by a dotted line.

SUMMARY OF THE INVENTION

It is therefore an object of the present invention to provide a multi-beam optical system capable of keeping the beam spot line straight even if the optical system includes the curved surface mirror.

For the above object, according to the present invention, there is provided an improved multi-beam optical system, which includes: a light source; a diffractive beam dividing element that divides the light beam emitted from the light source into a plurality of light beams emerging therefrom at different diffraction angles, respectively; a propagation optical system through which the divided light beams propagate, the propagation optical system including a curved surface mirror; and an image-forming optical system that forms a plurality of beam spots on an object surface by converging the light beams propagated through the propagation optical system.

The curved surface mirror is arranged such that center axes of the light beams reflected from the curved surface mirror are spatially separated from center axes of the light beams to be incident on the curved surface mirror at predetermined separation angles, respectively. This arrangement of the curved surface mirror bends the beam spot line. In the present invention, therefore, the bending of the beam spot line by means of the curved surface mirror is compensated by the arrangement of the diffractive beam-dividing element.

In order to compensate the bending of the beam spot line, the diffractive beam-dividing element is arranged such that the center axis of the light beam to be incident on the diffractive beam-dividing element is inclined with respect to the normal to a diffraction grating surface of the diffractive beam-dividing element. Such an arrangement of the diffractive beam-dividing element causes the bending of the beam spot line. Further, the degree of bending corresponds to an inclination angle of the incident ray with respect to the normal to the diffraction grating surface. Therefore, when the inclination angle diffractive beam-dividing element is appropriately set, the bending of the beam spot line which is caused by the curved surface mirror can be compensated (canceled) by the bending of the beam spot line caused by the diffractive beam-dividing element, which can keep the beam spot line straight.

The diffractive beam-dividing element may be arranged such that the diffraction grating surface is rotated by a predetermined angle about the rotation axis from an initial position where the normal to the diffraction grating surface is parallel to the center axis of the light beam to be incident on the diffractive beam-dividing element. The rotation axis is in parallel with a grating vector of the diffraction grating.

Further, the multi-beam optical system may include a scanning mechanism that scans the beam spots onto the object surface. The propagation optical system may be provided with a multichannel modulator that Independently modulates each of the light beams divided by the diffractive beam-dividing element.

DESCRIPTION OF THE ACCOMPANYING DRAWINGS

FIG. 2A is a developed view of the entire scanning optical system;

FIG. 2B shows one part of the scanning optical system viewed from an location B of FIG. 2A;

DESCRIPTION OF THE EMBODIMENTS

Figure 1:
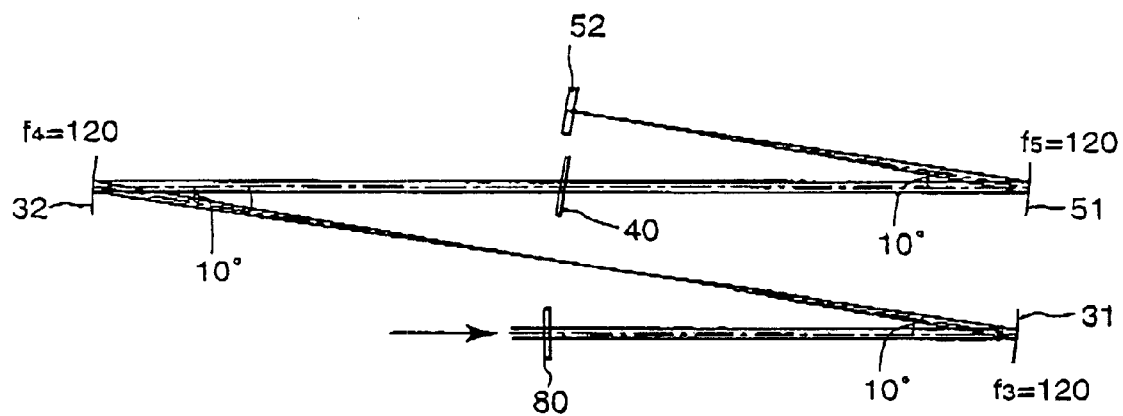
FIG. 1 shows one part of a scanning optical system embodying the invention.

A multi-beam optical system embodying the invention will be described with reference to the drawings. FIG. 1 shows one part of a scanning optical system embodying the invention; FIG. 2A is a developed view of the entire scanning optical system; and FIG. 2B shows one part of the scanning optical system viewed from location B of FIG. 2A. First, a generic construction of the embodiment will be described with reference to FIGS. 2A and 2B.

The scanning optical system of the embodiment includes, as shown in FIG. 2A, a laser source 10 that emits a ultraviolet laser beam, first and second relay optical systems 20 and 30 that relay the laser beam emitted from the laser source 10, a diffractive beam-dividing element 40 that diffracts the parallel laser beam relayed by the relay optical systems 20 and 30 to divide it into a plurality of separate beams that emerge at different diffraction angles, a propagation optical system 50 through which the divided light beams propagate, a polygon mirror 60 that deflects the light beams propagated through the propagation optical system 50, and a scan lens 70 as an image-forming optical system that forms a plurality of beam spots on an object surface S to be exposed by converging the light beams deflected by the polygon mirror 60. The polygon mirror 60 acts as a scanning mechanism that scans the beam spots onto the object surface S.

Since the laser source 10 emits the ultraviolet laser beam, it is preferable that a number of lenses included in the scanning optical system becomes as small as possible in order to reduce energy loss caused by absorption of lenses. Accordingly, the first relay optical system 20 is provided with a first curved surface mirror 21 and a second curved surface mirror 22. Similarly, the second relay optical system 30 is provided with a third curved surface mirror 31 and a fourth curved surface mirror 32. It should be noted that the curved surface mirrors are illustrated as transmitting elements such as lenses in FIGS. 2A and 2B to simply show the arrangement of the optical elements. A piezo mirror 80 is disposed between the first and second relay optical systems 20 and 30 for compensating facet error of the polygon mirror 60.

The diffractive beam-dividing element 40 includes a transparent substrate made of a glass or transparent resin, and a diffraction grating formed on one surface of the transparent substrate. The diffraction grating has a great numbers of fine grooves, which are arranged in parallel at equal pitch. The diffractive beam-dividing element 40 diffracts the incident laser beam to divide it into a plurality of separate beams that emerge at different diffraction angles. In FIG. 2A, a non-diffracted beam is illustrated by a solid line and one of diffracted beams is illustrated by a dotted line. As shown in FIG. 2B, the diffractive beam-dividing element 40 is arranged such that the center axis of the light beam to be incident thereon is inclined with respect to the normal to a diffraction grating surface of the diffractive beam-dividing element 40.

The propagation optical system 50 includes a fifth curved surface mirror 51, a multichannel acoustooptic modulator (AOM) 52 that independently modulates Intensity of the divided beams, and a collimator lens 53. In this case, the AOM 52 turns ON and OFF the light beams.

The AOM changes a direction of an emergent laser beam in response to the input ultrasonic wave. The detail construction of the AOM is not illustrated because the AOM is a device that is in general use. In the AOM, when the ultrasonic wave is applied to a medium, a diffraction grating is formed by a compression wave caused in the medium. One of the diffracted beam and the non-diffracted beam emerges as the modulated beam, and the other beam is cut off by a shading plate. The multichannel AOM 52 is provided with a plurality of channels on which the light beams divided by the diffractive beam-dividing element 40 are incident. The channels are independently controlled to independently modulate intensities of the divided beams, respectively.

The laser beam emitted from the laser source 10 is incident on the diffractive beam-dividing element 40 as a parallel beam through the first and second relay optical systems 20 and 30. The light beams divided by the diffractive beam-dividing element 40 are converged by the fifth curved surface mirror 51 and are incident on the multichannel AOM 52 to be modulated. The modulated light beams are collimated by the collimator lens 53 and deflected by the polygon mirror 60. The scan lens 70 converges the deflected light beams to form a beam spot line along which the beam spots align on the object surface S. The beam spots scan in the main scanning direction on the object surface S as the polygon mirror 60 rotates. On the other hand, the object surface S moves in the auxiliary scanning direction by means of a driving mechanism (not shown). The rotation of the polygon mirror 60 and the movement of the object surface S allow to plot a two-dimensional images on the object surface S.

Next, the details of the scanning optical system of FIG. 2A will be described with reference to FIG. 1. FIG. 1 shows an optical path between the piezo mirror 80 and the multichannel AOM 52.

The focal lengths of the third, fourth and fifth curved surface mirrors 31, 32 and 51 are equal, but not limited to, for example, approximately 120 mm. That is, these curved surface mirrors are concave mirrors, each of which radius of curvature is approximately 240 mm.

Each of the curved surface mirrors is arranged such that a center axis of the reflection light beam is spatially separated from a center axis of the incident light beam at a predetermined separation angle. Particularly, the fifth curved surface mirror 51, which is located at side of the object surface S than the diffractive beam-dividing element 40, is arranged such that center axes of the reflected light beams are spatially separated from center axes of the incident light beams at a predetermined separation angle, respectively. The every separation angle is set at approximately 10 degrees in this embodiment.

While the third curved surface mirror 31 and the fourth curved surface mirror 32 are illustrated such that they separate the incident and reflected beams in the same plane in FIG. 1 to simplify the drawing, the plane that contains the incident and reflected beams of the third curved surface mirror 31 is orthogonal to the plane that contains the incident and reflected beams of the fourth curved surface mirror 32, in actual device. This orthogonal arrangement reduces astigmatism.

The diffractive beam-dividing element 40 is arranged such that the diffraction grating surface is rotated by approximately 7.5 degrees about the rotation axis from an initial position in a clockwise direction in FIG. 1. The initial position is defined that the normal to the diffraction grating surface is in parallel with the center axis of the light beam to be incident on the diffractive beam-dividing element 40. The rotation axis is parallel to a grating vector of the diffraction grating. The grating vector is perpendicular to the extending direction of the grooves in the diffraction grating surface. Namely, the diffraction grating consists of a great numbers of equidistant grooves, as described above, and the grating vector is defined to be perpendicular to the grooves.

A relationship between the incident ray onto the diffractive beam-dividing element 40 and the divided rays will be described with reference to FIGS. 3 to 5. Each of light rays is illustrated by indicating the center axis of the respective light beams. In the following description, the incident ray is divided into five emergent rays, while the described relationship Is applicable to any cases regardless of number of the divided rays. Further, the spaces between each adjacent pair of the divided rays are exaggerated for purposes of illustration in FIGS. 3 to 5.

Figure 3:
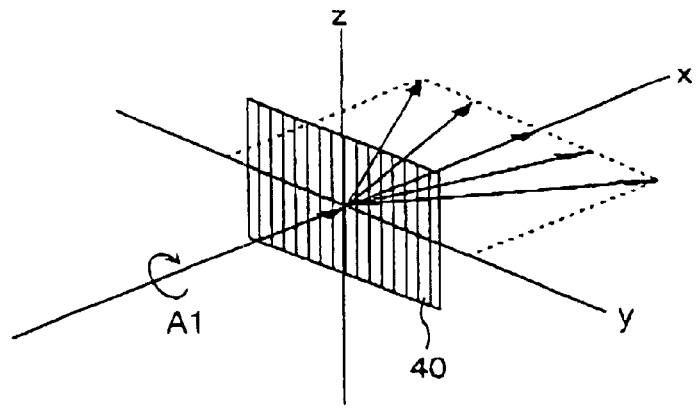
FIG. 3 shows a relationship between an incident ray onto a diffractive beam-dividing element and divided rays therefrom under a basic condition where the diffractive beam-dividing element is perpendicular to the incident ray.

FIG. 3 shows the initial position of the diffractive beam-dividing element 40, i.e., the diffraction grating surface is arranged to be perpendicular to the incident ray. The incident direction is defined as an x-axis, y- and z-axes are defined in a plane perpendicular to the x-axis being perpendicular to each other. When the diffraction grating surface is in parallel with a y-z plane and the direction of the grating vector is coincident with the y-axis as shown in FIG. 3, the diffractive beam-dividing element 40 divides the incident ray such that an x-y plane contains the emergent rays (the divided rays).

Figure 4:
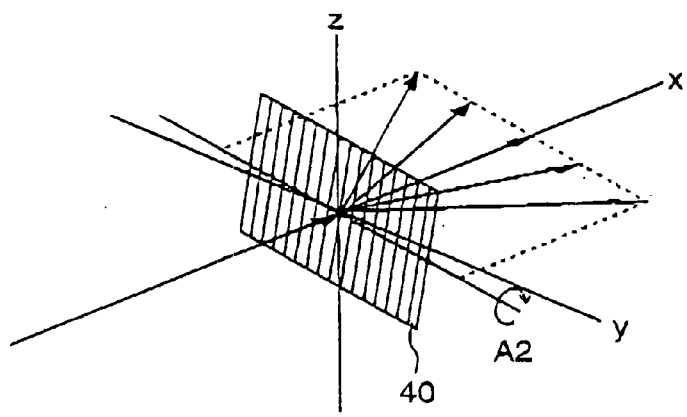
FIG. 4 shows the relationship between the incident ray onto the diffractive beam-dividing element and the divided rays therefrom when the diffractive beam-dividing element is rotated from FIG. 3 about an x-axis.

When the diffractive beam-dividing element 40 is rotated from FIG. 3 in the direction shown by the arrow A1 about the x-axis the diffractive beam-dividing element 40 is situated as shown in FIG. 4. While the diffraction grating surface is also in parallel with the y-z plane as with FIG. 3, the grating vector is inclined with respect to the y-axis. In the case illustrated in FIG. 4, the divided rays are located on a plane that is defined by rotating the x-y plane about the x-axis at the same angle as the rotation angle of the diffractive beam-dividing element 40 so that the rotated plane is inclined with respect to the x-y plane. Assuming that the y-axis corresponds the main scanning direction and the z-axis corresponds the auxiliary scanning direction, the diffractive beam-dividing element is to be arranged as shown in FIG. 4 in the conventional multi-beam scanning optical system.

When the multi-beam scanning optical system includes the curved surface mirror that separates a reflected beam from an incident beam in the z-axis direction and the diffractive beam-dividing element arranged as FIG. 4, the beam spot line bends depending on the separation angle of the curved surface mirror.

Figure 5:
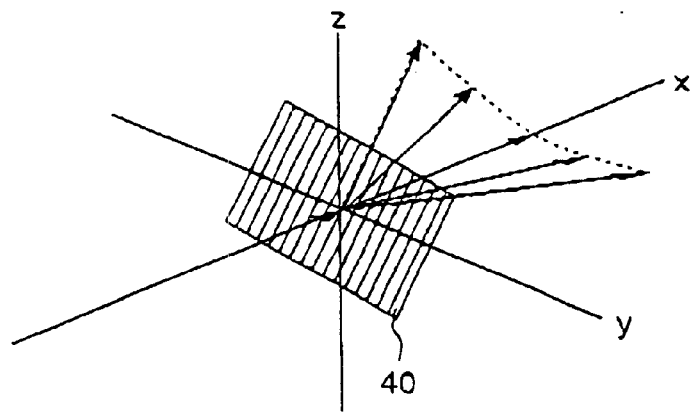
FIG. 5 shows the relationship between the incident ray onto the diffractive beam-dividing element and the divided rays therefrom when the diffractive beam-dividing element is rotated from FIG. 4 about an axis that is angled from a y-axis in a y-z plane.

In the multi-beam scanning optical system embodying the invention, the diffractive beam-dividing element 40 is arranged as shown in FIG. 5. In FIG. 5, the diffractive beam-dividing element 40 is further rotated from FIG. 4 in the direction shown by the arrow A2 about an axis that is parallel to the grating vector. The diffraction grating surface is inclined with respect to the y-z plane. Namely, the center axis of the incident beam (the incident ray) is inclined with respect to the normal to the diffraction grating surface. In the case illustrated in FIG. 5, the divided rays are located on a surface of a circular cone that contains the incident ray. The axis of the circular cone crosses the point of intersection of the incident ray and the diffraction grating surface and is in parallel with the extending direction of the phase pattern. When the divided rays are located on the surface of the circular cone, the beam spot line on the object surface S bends. Therefore, an appropriate setting of the inclination angle of the diffractive beam-dividing element 40 can compensate (cancel) the bending of the beam spot line by means of the separation of the light beams by the curved surface mirror in the z-axis direction.

Figure 6:
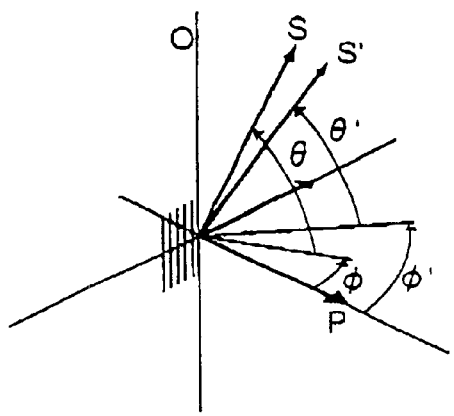
FIG. 6 shows directions of diffraction light rays divided by the diffractive beam-dividing element.

The directions of the diffracted light rays divided by the diffractive beam-dividing element 40 situated as shown in FIG. 5 will be described with reference to FIG. 6. Meanings of symbols used in FIG. 6 are defined as follows:

P: a unit vector of the normal to the diffraction grating surface,
S: a unit vector of the incident ray,
S': a unit vector of the diffraction ray, and
α: a unit vector of the diffraction grating.

Assuming that a grating pitch of the diffraction grating is referred to as d, a wavelength as λ and an order of diffraction as m, the following equation can be held.

$$S'=S+(m\lambda/d)\times\alpha$$

Further, when θ and θ' are defined as angles of the unit vectors S and S' formed with respect to a plane including the vectors P and α, respectively, sin θ=sinθ', and then θ≈θ'. Still further, when the unit vectors S and S' are projected onto the plane containing the vectors P and α, φ and φ' are defined as angles of the projected vectors formed with respect to the vector P, respectively, the following equation can be held:

$$\sin \phi' - \sin \phi = m\lambda/(d \times \cos \theta)$$

When the incident direction is fixed, sin φ and λ/(d×cos θ) can be considered as constants, so that the angle of the projected vector of the diffraction ray only depends on the order of diffraction m. Further, since θ≈θ', the vectors of the diffraction rays are located on a surface of a circular cone whose axis O crosses the point of intersection of the vectors P and α and is orthogonal to the plane including the vectors P and α.

Figure 7:
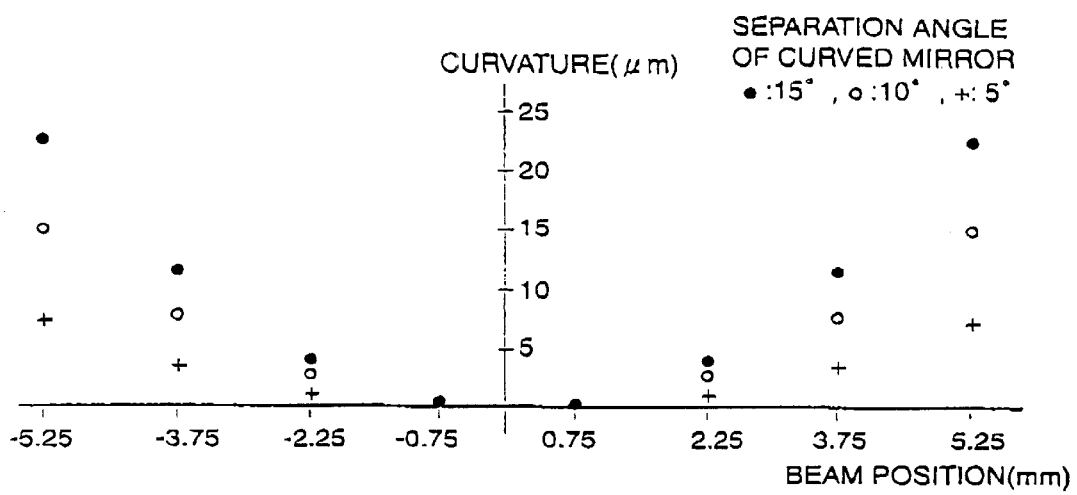
FIG. 7 is a graph showing a relationship between a separation angle of the curved surface mirror and bending of a beam spot line on the focal plane of the curved surface mirror.

FIG. 7 is a graph showing a relationship between a separation angle of the fifth curved surface mirror 51 and the bending of a beam spot line on the focal plane of the fifth curved surface mirror 51, i.e., the-position of the AOM. In the example of FIG. 7, the diffractive beam-dividing element 40 divides the incident beam into eight beams. FIG. 7 shows that the bending in the peripheral area becomes larger as the separation angle increases.

Figure 8:
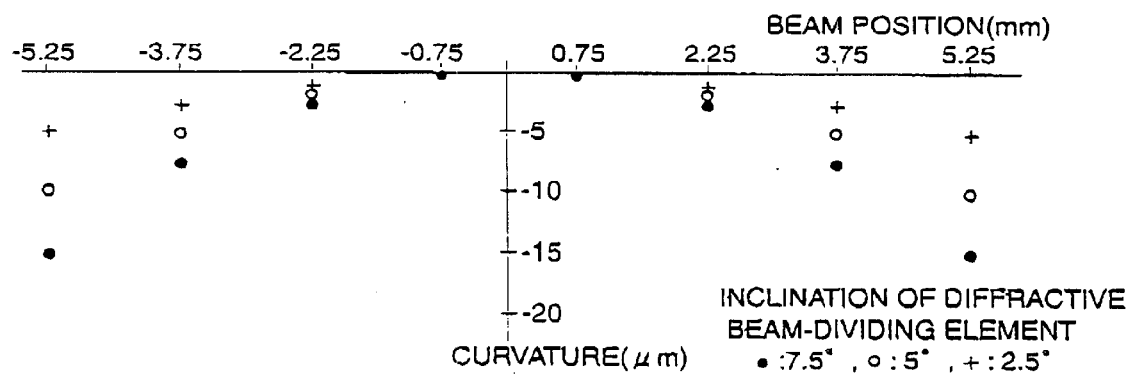
FIG. 8 is a graph showing a relationship between a inclination angle of the diffractive beam-dividing element and bending of the beam spot line on the focal plane of the curved surf ace mirror.
Figure 9:
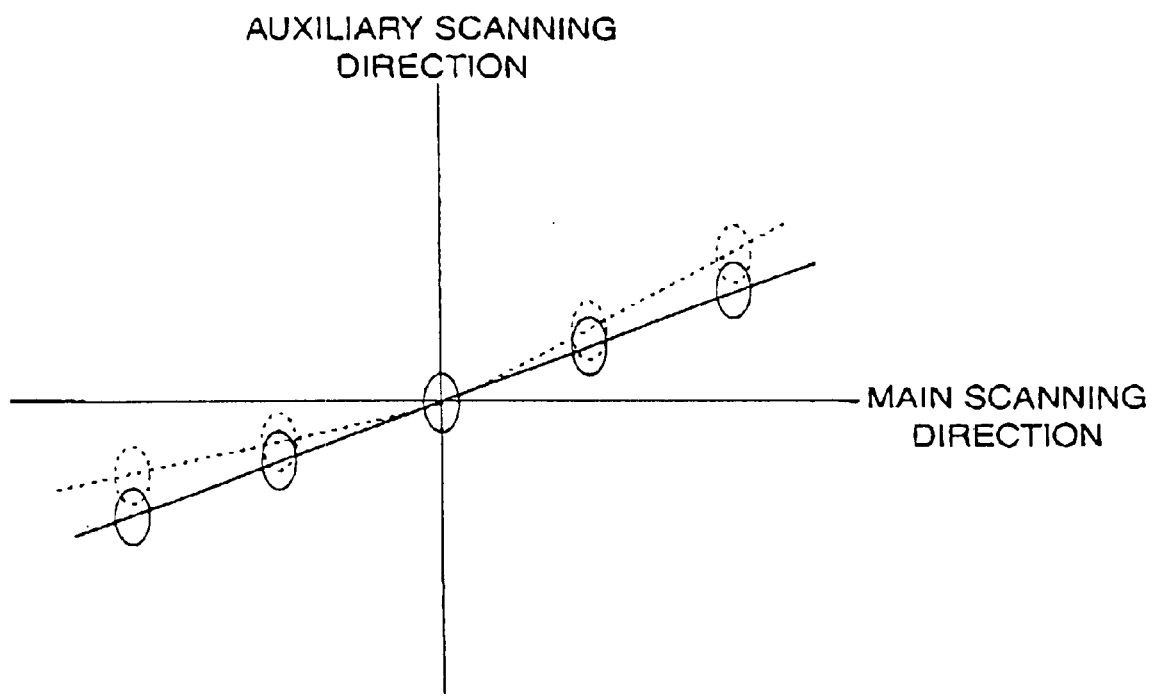
FIG. 9 is a graph showing bending of the beam spot line on the object surface due to the inclination of the curved surface mirror.

On the other hand, FIG. 8 is a graph showing a relationship between the inclination angle of the diffractive beam-dividing element 40 and the bending of the beam spot line on the focal plane of the curved surface mirror 51. In the example of FIG. 8, the diffractive beam-dividing element 40 divides the incident beam into eight beams. The inclination angle of the diffractive beam-dividing element 40 is defined as an angle of the normal, measured in the clockwise direction in FIG. 1, to the diffraction grating surface with respect to the incident ray. FIG. 8 shows that the bending in the peripheral area becomes larger as the inclination angle increases. Further, it has become clear that the inclination of the diffractive beam-dividing element bends the beam spot line in the opposite direction to the bending of the beam spot line due to the separation of the beams by the curved surface mirror.

Compared with FIGS. 7 and 8, the bending of the beam spot line caused when the separation angle of the fifth curved surface mirror 51 is 10 degrees can be substantially canceled with the bending of the beam spot line caused when the inclination angle of the diffractive beam-dividing element 40 is 7.5 degrees. Therefore, the separation angle of the fifth curved surface mirror 51 Is set at 10 degrees and the inclination angle of the diffractive beam-dividing element 40 is set at 7.5 degrees in the embodiment.

As described above, in the multi-beam optical system including a curved surface mirror, the bending of the beam spot line depending on the separation angle of the curved surface mirror can be canceled with the bending of the beam spot line due to the inclination of the diffractive beam-dividing element. Accordingly, even If the optical system employs the curved surface mirrors instead of the lenses in order to reduce the absorption of the ultraviolet light beam, the spaces between the adjacent scan lines can be kept constant, which increases accuracy of the plotting.

The present disclosure relates to the subject matter contained in Japanese Patent Application No. HEI 11-239293, filed on Aug. 26, 1999, which is expressly incorporated herein by reference in its entirety.

What is claimed is:

1. A multi-beam optical system, comprising:
   a light source;
   a diffractive beam-dividing element that divides a light beam emitted from said light source into a plurality of light beams emerging therefrom at different diffraction angles, respectively;
   a propagation optical system through which the divided plurality of light beams propagate, said propagation optical system including a curved surface mirror; and
   an image-forming optical system that forms a plurality of beam spots on an object surface by converging the plurality of light beams propagated through said propagation optical system,
   wherein said curved surface mirror is arranged such that center axes of light beams reflected from said curved surface mirror are spatially separated from center axes of light beams to be incident on said curved surface mirror at a predetermined separation angle, respectively,
   wherein said diffractive beam-dividing element is arranged such that the center axis of the light beam to be incident on said diffractive beam-dividing element is inclined with respect to the normal to a diffraction grating surface of said diffractive beam-dividing element so as to compensate bending of a beam spot line, along which said beam spots align, depending on said separation angle, and
   wherein said diffractive beam-dividing element is arranged such that said diffraction grating surface is rotated about a rotation axis from an initial position where a normal to said diffraction grating surface is in parallel with said center axis of the light beam to be incident on said diffractive beam-dividing element, said rotation axis is in parallel with a grating vector of said diffraction grating.

2. The multi-beam optical system according to claim 1, further comprising a scanning mechanism that relatively scans said beam spots onto said object surface.

3. The multi-beam optical system according to claim 1, wherein said propagation optical system further comprises a multichannel modulator that independently modulates each of the light beams divided by said diffractive beam-dividing element.

4. A multi-beam optical system, comprising:
   a light source;
   a diffractive beam-dividing element that divides a light beam emitted from said light source into a plurality of light beams emerging therefrom at different diffraction angles, respectively;
   a propagation optical system through which the divided plurality of light beams propagate, said propagation optical system including a curved surface mirror;
   an image-forming optical system that forms a plurality of beam spots on an object surface by converging the plurality of light beams propagated through said propagation optical system; and
   a scanning mechanism that relatively scans said plurality of beam spots on said object surface, wherein said curved surface mirror is arranged such that center axes of light beams reflected from said curved surface mirror are spatially separated from center axes of light beams to be incident on said curved surface mirror at a predetermined separation angle, respectively, and wherein said diffractive beam-dividing element is arranged such that the center axis of the light beam to be incident on said diffractive beam-dividing element is inclined with respect to the normal to a diffraction grating surface of said diffractive beam-dividing element so as to compensate bending of a beam spot line, along which said beam spots align, depending on said separation angle.

5. A multi-beam optical system, comprising:
   a light source;
   a diffractive beam-dividing element that divides a light beam emitted from said light source into a plurality of light beams emerging therefrom at different diffraction angles, respectively;
   a propagation optical system through which the divided plurality of light beams propagate, said propagation optical system including a curved surface mirror; and
   an image-forming optical system that forms a plurality of beam spots on an object surface by converging the plurality of light beams propagated through said propagation optical system, wherein said curved surface mirror is arranged such that center axes of light beams reflected from said curved surface mirror are spatially separated from center axes of light beams to be incident on said curved surface mirror at a predetermined separation angle, respectively, and wherein said diffractive beam-dividing element is arranged such that the center axis of the light beam to be incident on said diffractive beam-dividing element is inclined with respect to the normal to a diffraction grating surface of said diffractive beam-dividing element so as to compensate bending of a beam spot line, along which said beam spots align, depending on said separation angle, and wherein said propagation optical system comprises a multichannel modulator that independently modulates each of the light beams divided by said diffractive beam-dividing element.

* * * * *